April 27, 1948. W. E. RIECKEN 2,440,297
APPARATUS FOR AND METHOD OF ELECTRO-FORMING OF RECTIFIER ELEMENTS
Filed May 4, 1945 5 Sheets-Sheet 1

INVENTOR.
WILLIAM E. RIECKEN, DECEASED.
BY WILLIAM E. RIECKEN Jr. ADM.
BY
ATTORNEY

April 27, 1948. W. E. RIECKEN 2,440,297
APPARATUS FOR AND METHOD OF ELECTRO-FORMING OF RECTIFIER ELEMENTS
Filed May 4, 1945 5 Sheets-Sheet 2

INVENTOR.
WILLIAM E. RIECKEN, DECEASED.
BY WILLIAM E. RIECKEN JR. ADM.
BY
ATTORNEY

April 27, 1948. W. E. RIECKEN 2,440,297
APPARATUS FOR AND METHOD OF ELECTRO-FORMING OF RECTIFIER ELEMENTS
Filed May 4, 1945 5 Sheets-Sheet 3

INVENTOR.
WILLIAM E. RIECKEN, DECEASED.
BY WILLIAM E. RIECKEN Jr. ADM.
BY
ATTORNEY

April 27, 1948.  W. E. RIECKEN  2,440,297
APPARATUS FOR AND METHOD OF ELECTRO-FORMING OF RECTIFIER ELEMENTS
Filed May 4, 1945  5 Sheets-Sheet 4

INVENTOR.
WILLIAM E. RIECKEN, DECEASED.
BY WILLIAM E. RIECKEN Jr. ADM.
BY
ATTORNEY

April 27, 1948.　　　W. E. RIECKEN　　　2,440,297
APPARATUS FOR AND METHOD OF ELECTRO-FORMING OF RECTIFIER ELEMENTS
Filed May 4, 1945　　　5 Sheets-Sheet 5
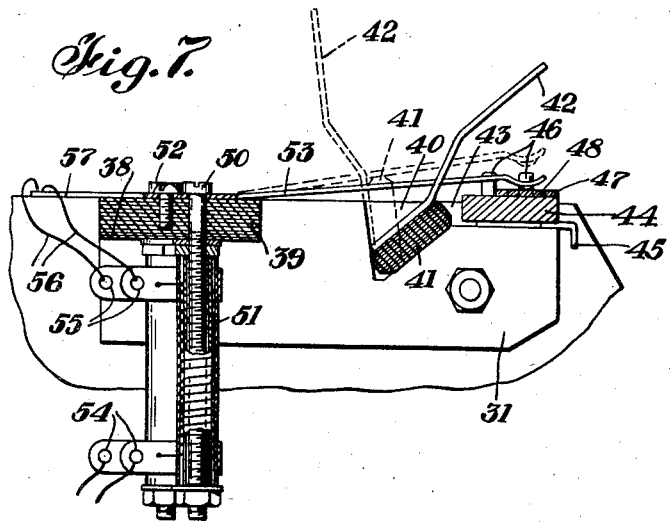
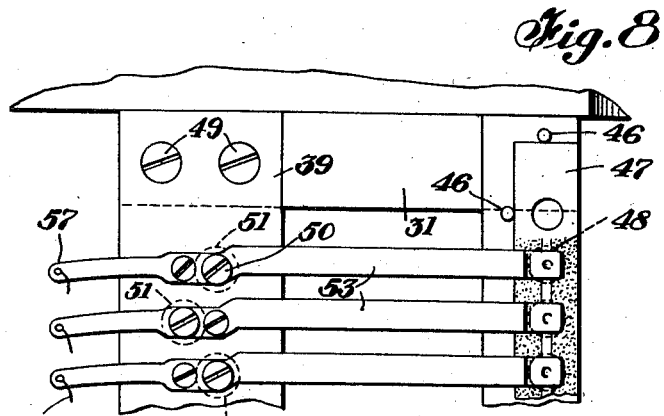
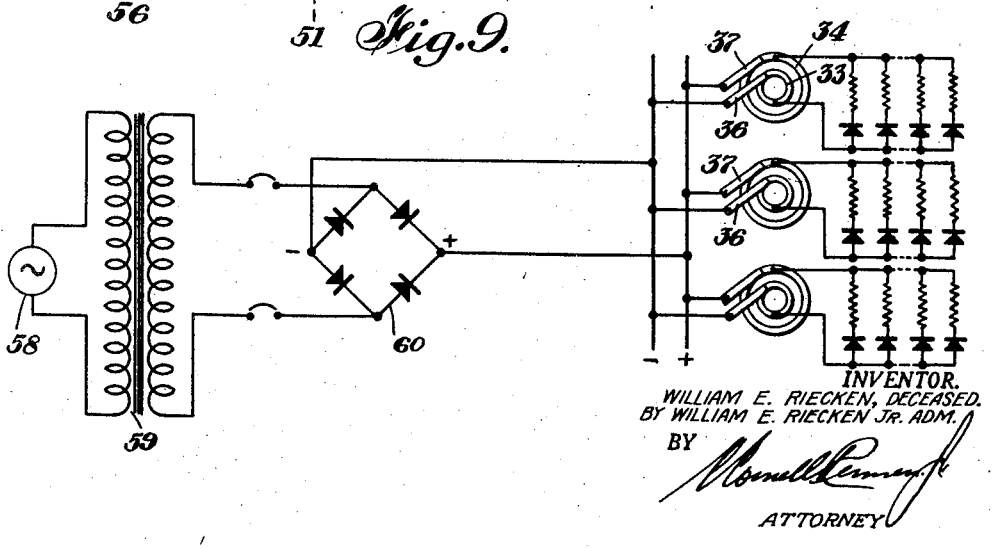
INVENTOR.
WILLIAM E. RIECKEN, DECEASED.
BY WILLIAM E. RIECKEN Jr. ADM.
BY
ATTORNEY

UNITED STATES PATENT OFFICE 2,440,297

APPARATUS FOR AND METHOD OF ELECTROFORMING OF RECTIFIER ELEMENTS

William E. Riecken, deceased, late of Leonia, N. J., by William E. Riecken, Jr., administrator, Leonia, N. J., assignor to Federal Telephone and Radio Corporation, New York, N. Y., a corporation of Delaware Application May 4, 1945, Serial No. 591,893

6 Claims. (Cl. 175—366)

The invention relates to apparatus for and methods of electro-forming of rectifier elements.

In the manufacturing process of rectifier elements it is known to provide a rectifying layer on a base plate and to cover this layer with a counter-electrode layer. An electro-forming process is applied to the thus formed rectifier element by subjecting the latter to a voltage which is generally higher than the normal voltage at which the rectifier operates in reverse direction.

It is also known that considerable heat develops during the electro-forming process and precautions have to be taken to limit the heat development to a temperature which is below the melting point of the counter-electrode alloy. One of the steps taken in this direction was to electro-form in cycles comprising intermittent periods of voltage application followed by intermittent periods in which the rectifier is cooled. This solution was rather time consuming and could not be well applied in mass manufacturing of rectifier elements.

It is, therefore, the main object of the present invention to provide an apparatus for electro-forming of rectifier elements which without interruption performs the entire electro-forming process and which allows a proper cooling of the rectifier elements during the electro-forming process.

It is a further object of the present invention to provide an apparatus which keeps the temperature of the rectifier elements about constant during the entire electro-forming process.

It is still a further object of the present invention to provide an apparatus which allows the electro-forming of a plurality of rectifier elements at the same time.

It is another object of the present invention to provide a method of electro-forming rectifier elements according to which a plurality of rectifier elements are moving during the entire electro-forming process whereby heat dissipation from the elements is facilitated.

It is still another object of the present invention to provide a method of electro-forming rectifier elements according to which the elements which have been electro-formed can be removed and new elements be inserted for their electroformation during their movement.

With these and other objects in view which will become apparent from the following description, the invention will be clearly understood in connection with the accompanying drawings, in which:

Fig. 7 is a sectional side view in enlarged scale through a part of a drum;

Fig. 8 is a plan view of a part of a drum corresponding to Fig. 7, and

Fig. 9 shows a schematic diagram of the electric circuit used in connection with the electro-forming apparatus.

Figure 1:
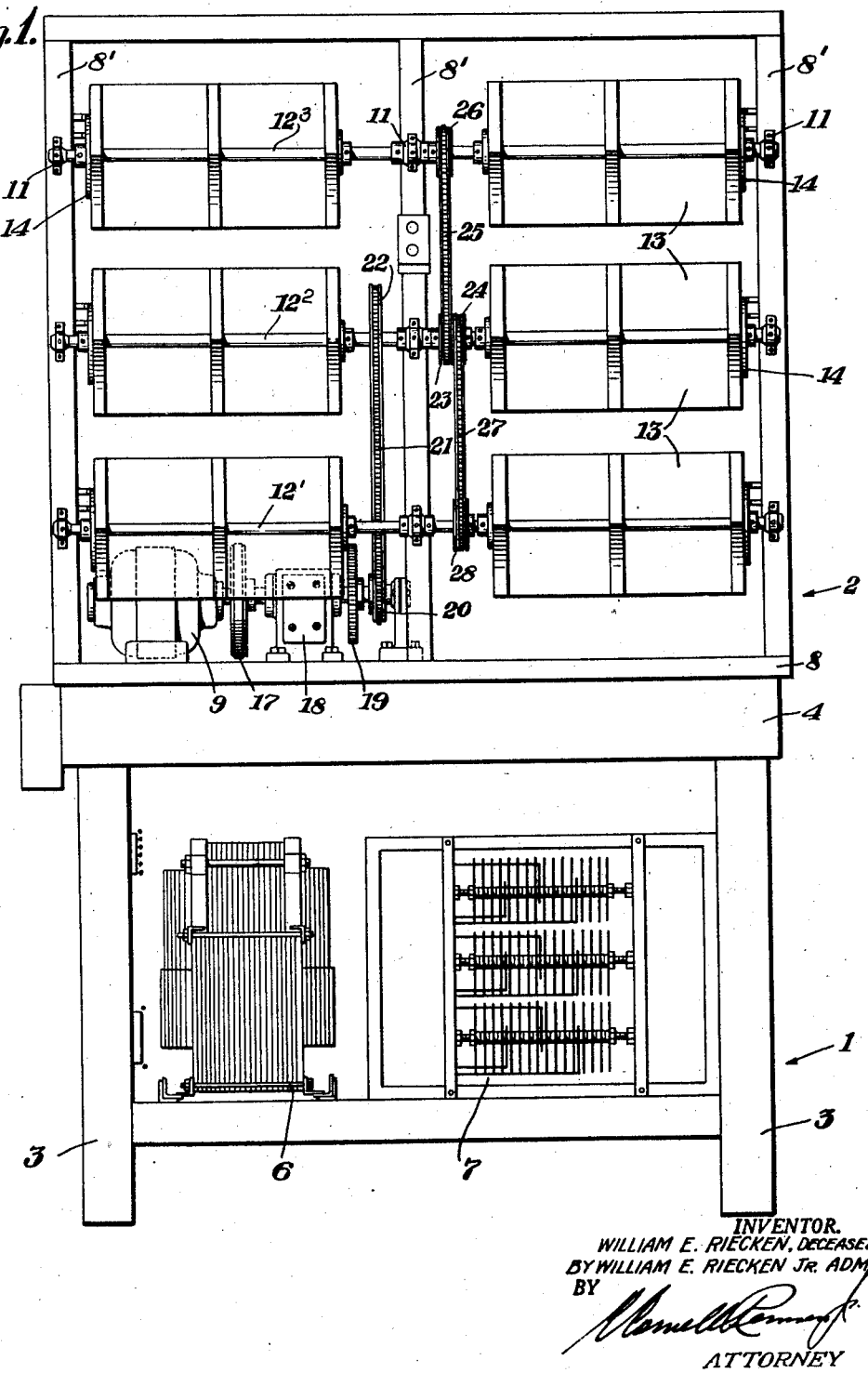
Figure 1 is an elevational front view of the apparatus for electro-forming of rectifier elements.

Referring now to the drawings, the apparatus for electro-forming rectifier elements comprises a lower supporting frame 1 and an upper frame 2. The lower frame 1 consists of a plurality of leg like blocks 3 which carry on their top a block 4. A board 5 is arranged near the bottom of the frame 1 carried by the blocks 3, which board is adapted to support the transformer 6 and the rectifier 7.

The upper frame 2 consists of a base 8 secured to the block 4 and a plurality of pairs of frame parts 8' extending upwards against each other at an angle of about 60° to the base 8 forming a triangle together with its base 8.

An electromotor 9 and the driving means 10 for the rotating drums which will be described later, are mounted on the base 8.

The front pieces of the frame parts 8' carry on different levels a number of bearings 11 which support a number of shafts $12^1$, $12^2$, $12^3$, each of which carries preferably at least two rotating double drums 13.

The drums 13 are secured to their shafts by hubs 14 fixed to the drums 13 by means such as screw bolts 15 and connected to the shafts preferably by any suitable means, as small set screws (not shown). Any kind of driving mechanism can be used for rotating the shafts and thereby the drums 13 and one preferred driving mechanism is shown in the drawings by example only.

Figure 2:
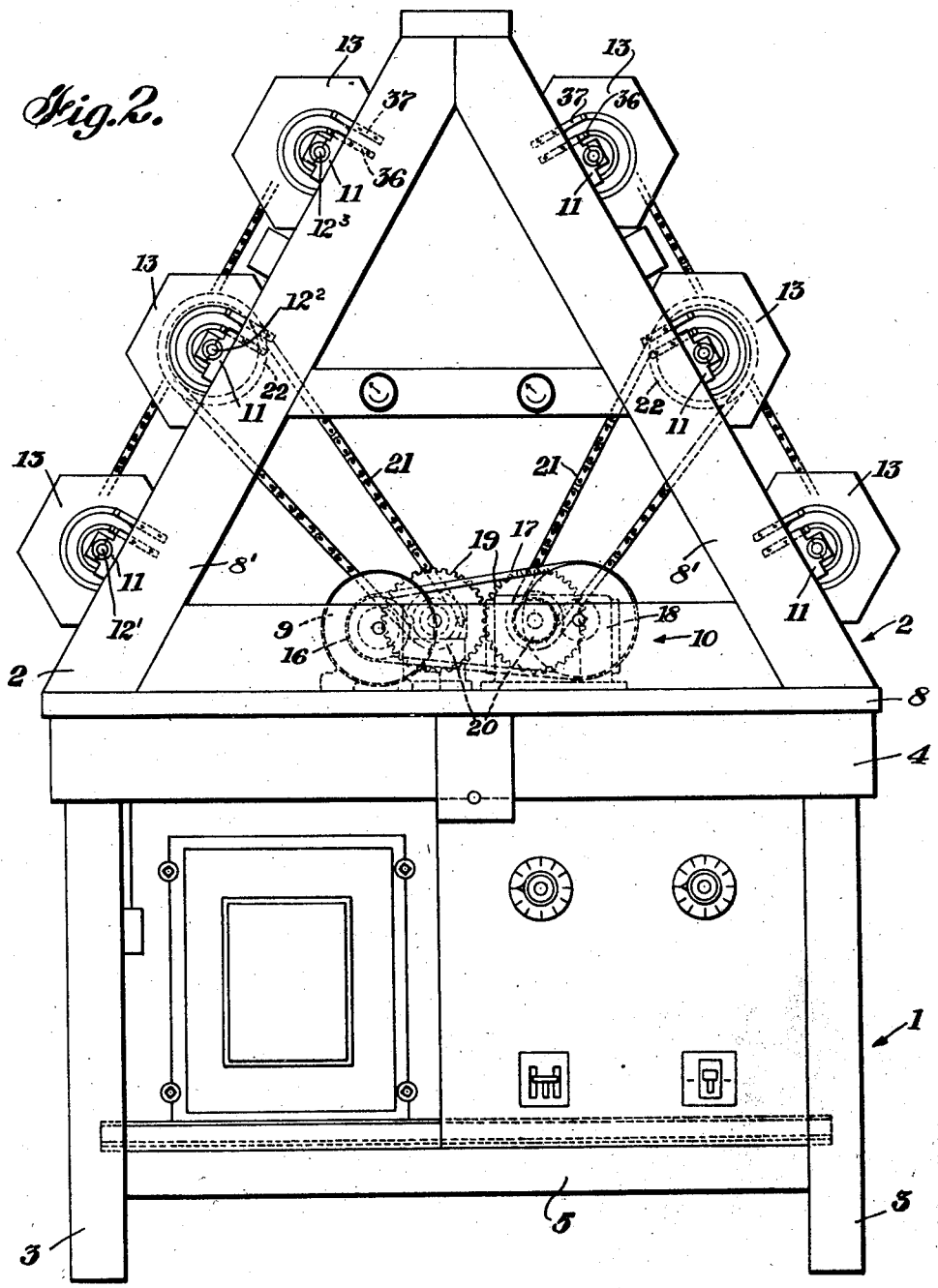
Fig. 2 is an elevational side view of the apparatus shown in Fig. 1.
Figure 3:
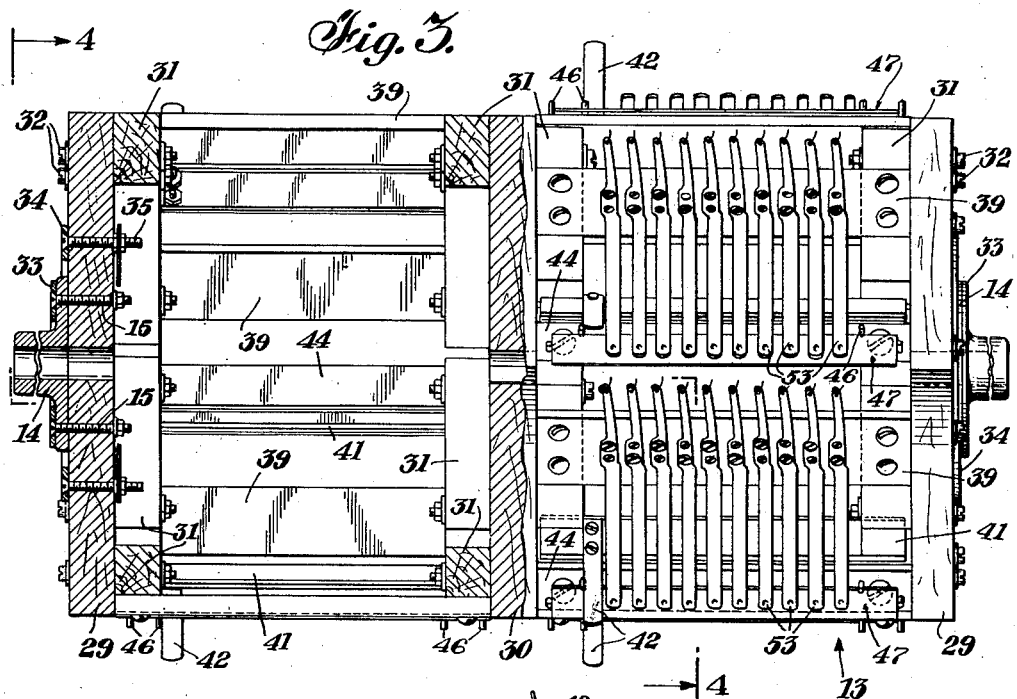
Fig. 3 is an elevational front view of a drum used as carrier for the rectifier elements.
Figure 5:
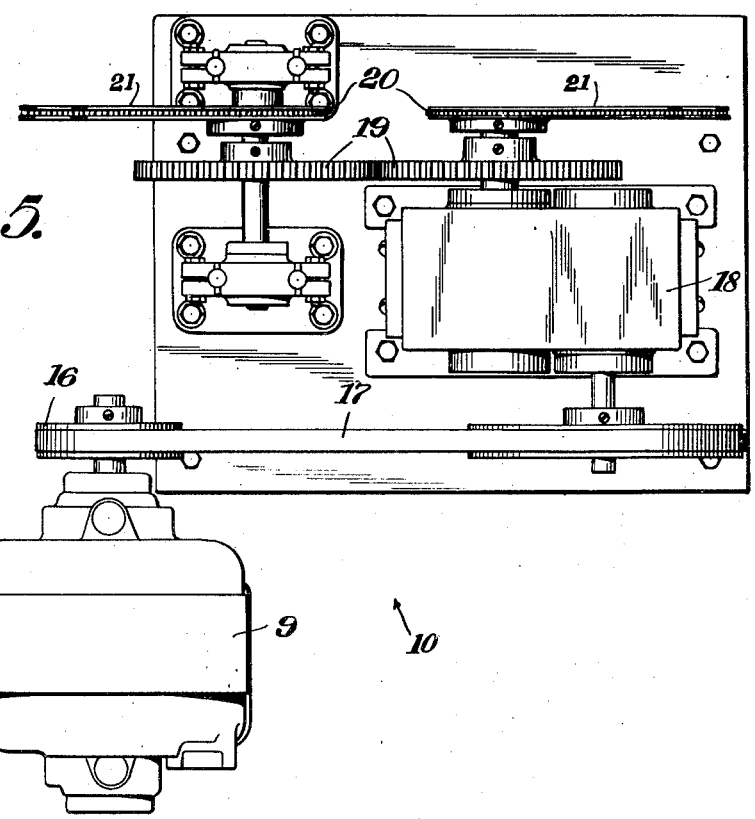
Fig. 5 is a plan view of the driving mechanism for rotation of the drums.

As can be seen in Figs. 1, 2 and 5, the driving mechanism preferably comprises an electromotor 9 the pulley 16 of which transfers the power over a belt 17 to a speed reducer 18 of any known construction. The speed reducer 18 is connected with two gears 19 each of which drives in turn a sprocket wheel 20. In the embodiment shown in the drawings each frame part 8' carries three drums 13 on different levels, and since, as stated before, double drums are provided, two double-drums 13 are secured to each of the shafts 12¹, 12² and 12³ in each unit, the latter thereby containing six double-drums at its front and six at the rear. The shafts can also run through to the next adjacent unit, which reduces the number of driving means for the shafts and also simplifies the circuit by using the shaft for the return current of several units. Conforming with this structure a sprocket chain 21 connects each one of the sprocket wheels 20 with a sprocket wheel 22 secured to the middle shaft 12². The middle shafts 12² carry two further sprocket wheels 23 and 24, the sprocket wheels 23 driving over sprocket chains 25 other sprocket wheels 26 secured to the upper shafts 12³ and the sprocket wheels 24 driving over sprocket chains 27 other sprocket wheels 28 keyed to the lower shafts 12¹. By this arrangement one motor provides the driving mechanism for all drums 13 supported by the upper frame 2 not only for one unit, but for several units, if the shafts 12¹, 12² and 12³ extend to adjacent units.

Figure 4:
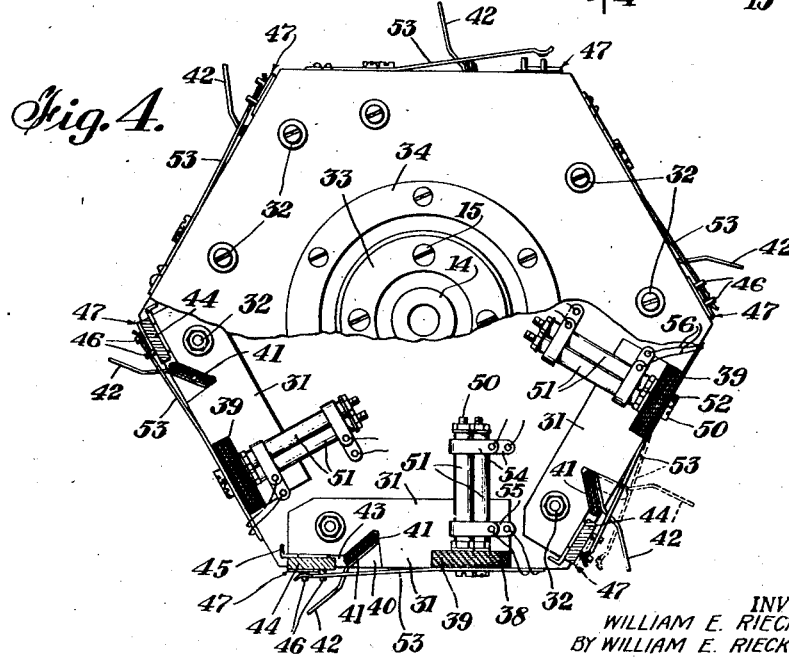
Fig. 4 is an elevational side view partly in section along the lines 4—4 of Fig. 3.

The shafts 12¹, 12², and 12³ are supported in each unit preferably by at least three bearings 11 mounted on the frame parts 8'. Each double-drum includes three cross-boards 29 and 30, respectively, the boards 29 being arranged on both ends and the board 30 at its center. The boards 29 and 30 are preferably of hexagonal shape (Fig. 4), though triangular, rectangular or any polygonal shape can be provided and they carry on their facing surfaces six blocks 31 which are fastened to the end boards 29 and 30, respectively, by means such as screw bolts 32 (Fig. 4). A hub 14 is secured to the end boards 29, which hub 14 is connected with the respective shafts 12¹, 12² and 12³, respectively, and one of the hubs 14 carries a contact ring 33. A second contact ring 34 of somewhat larger diameter is mounted by screw bolts 35 on one of the head boards 29. Brushes 36 and 37, respectively, contacting the rings 33 and 34, respectively, provide outgoing and incoming current for the rotating drums 13.

As shown in Figs 3, 4, 7 and 8, each block 31 is of approximately rectangular shape and has on its periphery at one end a rectangular cut-out 38, which is adapted to receive an insulating bar 39. Next to the rectangular cut-out 38 the block 31 has also on its periphery a triangular cut-out 40 which receives a lever 41 having a handle 42 which lever 41 is loosely inserted into the cut-out 40. The lever 40 can be put into operating position by abutting one face of the triangular cut-out 40, as shown in full lines in Figs. 4 and 7, or into inoperating position by abutting the other face of the cut-out 40, as shown in dotted lines in Figs. 4 and 7. Finally, at the extreme other end of the block 31 on its periphery is provided a small rectangular cut-out 43 which receives a metal bar 44 resting on a contact lug 45. The top of the bar 44 is equipped with four pins 46 which fix the position of an inserted metal strip 47 containing cut-out but still retained rectifier elements 48. Two of the pins 46 limit the setting of the metal strip 47 in lateral direction and the other two in longitudinal direction.

Each bar 39 extends from an end board 29 to the center board 30, and is screwed to the blocks 31 by screw bolts 49, (Fig. 8). Furthermore, each bar 39 has a number of borings some of which extend entirely through the bar 39 and some of which extend through a part of the bar 39 only.

The borings extending entirely through the bar 39 are provided for receiving long screw bolts 50 for mounting of resistors 51. The borings extending only partly through the bar 39 receive small screw bolts 52. On the outside of the bar 39 and retained in position by the screw bolts 50 and 52 a number of springs 53, corresponding with the number of rectifier elements 48 in the strip 47, are arranged, one end of which spring 53 has the tendency to press against the corresponding rectifier element 48 in the strip 47 and thereby closing the electroforming circuit through each of the rectifier elements. By turning the above mentioned lever 41 from its operative to its inoperative position all the springs 53 mounted on one bar 39 can be lifted from their operative contact position (shown in full lines in Fig. 7) to their lifted inoperative position (shown in dotted lines in Fig. 7). As can be seen clearly in Figs. 7 and 8 the resistors 51 are arranged in staggered position which is necessary to allow the springs 53 and a coordinated resistor 51 to each spring 53 to be arranged in a distance corresponding with the distance of the rectifier elements 48 retained in the strip 47. In the embodiment shown in the drawing strips 47, which contain ten rectifier elements each, are mounted on the metal bar 44 and, therefore, ten springs 53 are necessary to provide electroforming voltage to each rectifier element 48. Each resistor 51 is provided with a positive lead 54 and a negative lead 55. The positive leads 54 are connected with the positive leads of the adjacent resistors 51 thereby providing parallel electric connection for the resistors whereas each lead 55 has a connecting wire 56 to the rear end 57 of the coordinated spring 53.

By providing a center frame part 8' between the end frame parts 8' two double drums can be provided at the front and the rear of the unit on each of the shafts 12¹, 12² and 12³ which amount to six double drums each at the front and the rear of the units. If hexagonal end boards 29 are used, each single drum 13 receives six strips 47 containing ten rectifier elements 48 each, so that each rotating double drum electroforms one hundred twenty rectifier elements and each unit containing twelve double drums electroforms fourteen hundred forty rectifier elements at the same time.

Figure 6:
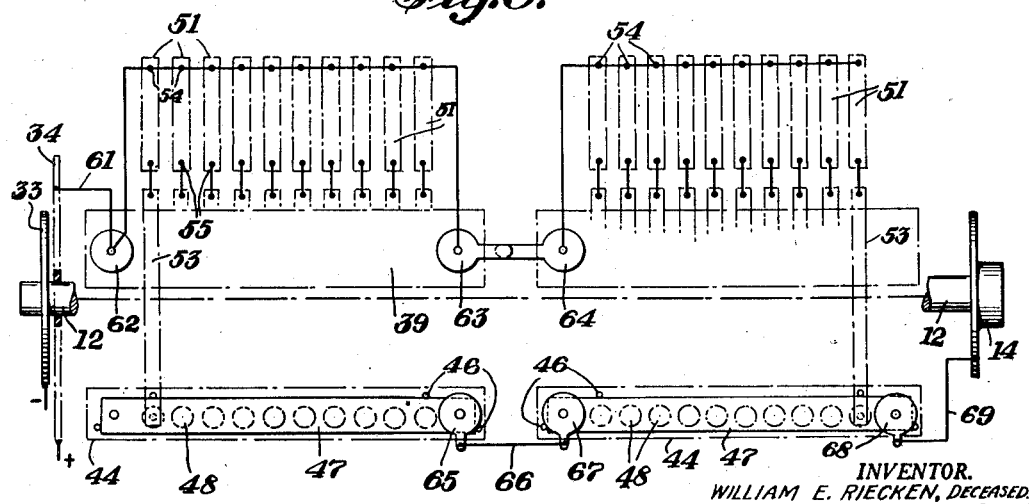
Fig. 6 shows the wiring diagram for one row of contacts.

The application of voltage to each rectifier element 48 for the electroforming process is illustrated in Figs. 6 and 9 of the drawings. Fig. 9 shows a schematic diagram, and as shown the AC source 58 is connected to the transformer 59 and the secondary of the latter to a rectifier bridge 60. The positive of the rectifier bridge 60 is connected with the brushes 37 contacting the outer rings 34 which are mounted on the head boards 29 of drums 13. The outer rings 34 are electrically connected in parallel arrangement with the resistors 51 mounted on each bar 39 and each resistor in series with the corresponding rectifier element 48 over the corresponding flat spring 53. All rectifier elements 48 are in parallel electrical connection with the inner contact ring 33 mounted on the metal hub 14. The brushes 36 contacting the inner contact ring 33 return the current to the negative of the rectifier bridge 60.

As is clearly shown in the wiring diagram of Fig. 6 the current enters the rotating drums 13 through the outer contact ring 34. From there a wire connection 61 is arranged to a contact lug 62 from which the current is carried in parallel connection to all resistors 51 through the leads 54. The leads 55 of the resistors 51 connect the rear ends of the flat springs 53 and each of these springs 53 contacts one corresponding rectifier element 48. A lug 62 is mounted on one end of the bar 39 of insulating material. On the other end of the bar 39 another contact lug 63 is provided which is connected with the lead 54 of the last resistor 51. The lug 63 is integrally formed or connected with a lug 64 which provides parallel connection with the leads 54 of the resistors 51 of the second half of the drum 13.

The current flows in the first half of the double drum 13 from the springs 53 through the rectifier elements 48 and through the supporting metal bar 44 to a contact lug 65 which has a wire connection to a contact lug 67 arranged on the inner end of the bar 44 of the second half of the double drum 13. In the second half of the double drum 13 the current flows in the same way, as described before, through each rectifier element 48 and finally to a contact lug 68 at the outer end of the bar 44 from which a wire 69 connects the latter with the hub 14 at the right end of the double drum 13. The shafts $12^1$, $12^2$ and $12^3$ return the current to the inner contact rings 33 mounted on the metal hub 14 which is arranged on the other end of the shafts $12^1$, $12^2$ and $12^3$, respectively, wherefrom a brush 36 returns the current to the rectifier bridge 60. When the shafts $12^1$, $12^2$ and $12^3$ are extended to one or more additional units, only one inner contact ring 33 is necessary for the whole series of drums 13 mounted on the respective shaft for the returning current, whereas each drum necessarily has a special outer contact ring 34 for the incoming current.

The electroforming process according to the method of the present invention is performed in the following manner:

Each drum 13 of hexagonal shape receives six strips 47 containing ten rectifier elements 48 each which strips 47 are placed on the six metal bars 44 mounted on each drum 13. Before inserting the strips 47 the six levers 41 are turned by means of their handles 42 into inoperative position in order to lift all ten contact springs 53 of each of the respective sides of the drum 13. Upon placing the strips 47 on the metal bars 44 the levers 41 are returned again to the previous, namely operative position each spring 53 contacting a corresponding rectifier element 48 in the strips 47. The latter are placed on the metal bars 44 in such a way that they abut the rear pins and side pins 46. Since the drums 13 rotate very slowly the removal or replacement of the strips 47 can be done during operation, that means during rotation of the drums 13. By closing the circuit electroforming current is running from the contact rings 34 parallel through all the resistors 51 coordinated to each spring 53 through the latter and through the respective rectifier elements 48, the metal bar 44 electrically connected with contact lugs 65 and 68, respectively, and further over a hub mounted on one end of the drum 13 through the shaft 12 to a contact ring 33 mounted on a hub 14 arranged on the other end of the drum 13 where a brush 36 returns the current to its source 58 over a rectifier 7 and transformer 6.

The electroforming process takes place for the usual necessary time to obtain the desired characteristics for the rectifier elements. Due to the rotation of the drum and also due to its hollow and open construction a stream of hot air caused by the electroforming process can easily escape through the drum 13. It has been found that by using the method of the present invention not only lower temperature will be maintained during the electroforming process, but also, what is essential, substantially constant temperature will result during the electroforming process.

While the principles of the invention have been disclosed in connection with a single embodiment, it will be understood that this embodiment is given by way of example only and not as limiting the scope of the invention as set forth in the objects and the appended claims.

What is claimed is:

1. In an apparatus for electroforming of rectifier elements, a rotating drum, means for supporting and for electrically connecting a plurality of metal strips containing rectifier elements on said drum, means including high and low potential conductors having physical contact with said drum for supplying electric current to said rotating drum and in parallel arrangement to each of said rectifier elements contained in said strip, said supporting and connecting means comprising resilient contact means.

2. In an apparatus for electroforming of rectifier elements, as set forth in claim 1, including means for lifting said resilient contact means for insertion or removal of said strips containing rectifier elements.

3. In an apparatus for electroforming of rectifier elements, as set forth in claim 1, said drum being secured on a rotating shaft and comprising two multi-sided end plates spaced at a pre-determined distance, a hub connected with each said plate and secured to said shaft, at least one of said plates carrying a contact ring for incoming current, at least one of said hubs carrying a contact ring for outgoing current, a plurality of blocks secured to the periphery of each of said plates, and means for placing said strips on each of the sides of said drum.

4. In an apparatus for electroforming of rectifier elements, as set forth in claim 1, said drum comprising two end plates spaced at predetermined distance, a plurality of blocks arranged at the periphery of each of said plates two recessses in each of said blocks, one recess of one block of one plate and that of the corresponding block of the other plate adapted to receive a bar of insulating material carrying a plurality of resistors and a plurality of contact springs corresponding to the number of rectifier elements in said strip, said other recess of one block of one plate and that of the corresponding block of the other plate adapted to receive a loosely mounted lever for lifting all the said contact springs arranged on one side of the drum in the inoperative position, and a conducting bar mounted on one block of one plate and a corresponding block of the other plate adapted to support and locate said strips containing rectifier elements.

5. In an apparatus for electroforming of rectifier elements, a drum secured to a rotating shaft and comprising two polygonal end plates, a block secured respectively at the periphery along each side of said plates and the blocks of one of said plates spaced in predetermined distance from the corresponding blocks of the other of the said plates, each pair of said blocks comprising one block of one of said end plates and the corresponding block across on the other of said end plates carrying a bar of insulating material, a loosely mounted lever and a metal bar, said bar of insulating material adapted to carry a plurality of resistors and a plurality of contact springs corresponding with the number of rectifier elements contained in a strip, said loosely mounted lever adapted to lift said contact springs from their operative into inoperative position, said metal bar adapted to support and locate said strip containing a plurality of rectifier elements.

6. In an apparatus as set forth in claim 5, including a hub connected with each of said end plates, a contact ring on at least one of said end plates and a contact ring on at least one of said hubs, and brushes contacting said contact rings for supplying electric current to the rectifier elements, said first mentioned contact ring adapted to be in parallel electrical connection with said resistors, each of the resistors in electrical connection with its corresponding contact spring, and said last mentioned contact ring adapted to be in electrical connection with metal bar supporting said strips.

WILLIAM E. RIECKEN, Jr.,
*Administrator of the Estate of the Late William E. Riecken.*

REFERENCES CITED

The following references are of record in the file of this patent:

UNITED STATES PATENTS

| Number | Name | Date |
|---|---|---|
| 1,807,157 | Hughes | May 26, 1931 |
| 2,093,484 | Schlatter | Sept. 21, 1937 |
| 2,103,623 | Kott | Dec. 28, 1937 |
| 2,351,321 | Compton | June 13, 1944 |